US010853506B2

United States Patent
Ruiz et al.

(10) Patent No.: US 10,853,506 B2
(45) Date of Patent: Dec. 1, 2020

(54) SYSTEMS AND METHODS FOR PREVENTING LEAKAGE OF PROTECTED DOCUMENT DATA

(71) Applicant: Dell Products L.P., Round Rock, TX (US)

(72) Inventors: Ricardo Antonio Ruiz, The Colony, TX (US); Jonathan Nathan Yanez, Allen, TX (US); Luis Antonio Valencia Reyes, Zapopan (MX); Venkata Satya Narasimha Murthy Prayaga, Piscataway, NJ (US); James Darrell Testerman, McKinney, TX (US); Dongli Wu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 260 days.

(21) Appl. No.: 16/025,193

(22) Filed: Jul. 2, 2018

(65) Prior Publication Data
US 2020/0004974 A1     Jan. 2, 2020

(51) Int. Cl.
G06F 21/60     (2013.01)
G06F 9/54      (2006.01)
G06F 16/93     (2019.01)

(52) U.S. Cl.
CPC ............ G06F 21/604 (2013.01); G06F 9/543 (2013.01); G06F 16/93 (2019.01)

(58) Field of Classification Search
CPC ........ G06F 21/60; G06F 21/62; G06F 21/604; G06F 21/6236; G06F 21/6218; G06F 21/6209; G06F 16/93; G06F 9/543
See application file for complete search history.

(56) References Cited

U.S. PATENT DOCUMENTS

| 8,677,132 B1 | 3/2014 | Liao et al. |
| 10,387,669 B1* | 8/2019 | Lim .................... G06F 21/604 |
| 2007/0143603 A1 | 6/2007 | Hadden et al. |
| 2008/0295174 A1* | 11/2008 | Fahmy .................... G06F 21/57 726/23 |
| 2009/0128859 A1 | 5/2009 | Daos et al. |
| 2013/0212432 A1 | 8/2013 | Guthrie et al. |

(Continued)

Primary Examiner — Kristine L Kincaid
Assistant Examiner — Shaqueal D Wade
(74) Attorney, Agent, or Firm — Baker Botts L.L.P.

(57) ABSTRACT

Systems and methods for preventing leakage of protected data to unsecured applications and documents may include determining that a first document is a protected document in a managed application, detecting a request to copy protected data from the first document to a system clipboard accessible by unprotected documents, redirecting the protected data to a secure clipboard, determining that a second document is an unprotected document, detecting a request to paste the protected data into the second document, and refraining from pasting the protected data into the second document. The secure clipboard may be implemented by a data leakage prevention (DLP) client. It may be separate from the system clipboard and inaccessible by unprotected documents. Dynamic-link library injection and API hooking may allow the DLP client to intercept clipboard related function calls made by managed applications into the operating system and to transparently change the behavior of the managed application.

17 Claims, 5 Drawing Sheets

(56) References Cited

U.S. PATENT DOCUMENTS

| | | |
|---|---|---|
| 2014/0032691 A1* | 1/2014 | Barton .................. G06F 21/604 |
| | | 709/206 |
| 2014/0118766 A1 | 5/2014 | Kang |
| 2015/0143091 A1 | 5/2015 | Brace et al. |
| 2015/0149749 A1 | 5/2015 | Brace et al. |
| 2015/0154660 A1 | 6/2015 | Weald et al. |
| 2015/0163206 A1 | 6/2015 | McCarthy et al. |
| 2017/0004316 A1* | 1/2017 | Walton ................ G06F 21/6281 |
| 2018/0137300 A1* | 5/2018 | Shi ........................ G06F 21/554 |
| 2019/0065701 A1* | 2/2019 | Yadav .................. G06F 21/602 |
| 2019/0266279 A1 | 8/2019 | Aseev et al. |

* cited by examiner

SYSTEMS AND METHODS FOR PREVENTING LEAKAGE OF PROTECTED DOCUMENT DATA

BACKGROUND

Field of the Disclosure

This disclosure relates generally to information handling systems and more particularly to systems and methods for preventing leakage of protected document data to unsecured applications and documents.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Applications usable to generate, view, and/or edit documents or files of a variety of different types may be installed and operate on information handling systems. Some of these applications may, along with operating system support, enable file protection through encryption or other means. In most operating systems, data can be transferred from one application to another through the use of a clipboard application managed by the operating system. However, it is desirable to prevent data leakage from protected applications and documents to unsecured applications and documents.

SUMMARY

In one aspect, a disclosed information handling system includes at least one processor, and a memory medium coupled to the at least one processor and storing instructions that when executed by the at least one processor cause the information handling system to determine that a first document is a protected document in a managed application, to detect a request to copy protected data from the first document to a system clipboard accessible by unprotected documents, to redirect the protected data to a secure clipboard, the secure clipboard being separate from the system clipboard and inaccessible by unprotected documents, to determine that a second document is an unprotected document, to detect a request to paste the protected data into the second document, and to refrain from pasting the protected data into the second document.

In any of the disclosed embodiments, the instructions may further cause the information handling system to determine that a third document is a protected document, to detect a request to paste the protected data into the third document, and to paste the protected data from the secure clipboard into the third document.

In any of the disclosed embodiments, the instructions may further cause the information handling system to detect a request to copy unprotected data from the second document to the system clipboard, to copy the unprotected data to the system clipboard, to detect a request to paste the unprotected data into the first document, and to paste the unprotected data from the system clipboard into the first document.

In any of the disclosed embodiments, prior to detecting the request to copy the protected data from the first document to the system clipboard, the instructions may further cause the information handling system to redirect a request to open the first document to a background process that controls access to one or more documents including the first document and the second document, to determine policy information associated with the first document and a user of the first managed application on whose behalf the request to open the first document was received, wherein determining that the first document is a protected document in the first managed application is dependent on the policy information associated with the first document and the user, to determine that the user is authorized to open the first document, to provide the first document to the first managed application, to redirect a request to open the second document in the first managed application or in a second managed application to the background process on behalf of the user, to determine policy information associated with the second document and the user, wherein determining that the second document is an unprotected document is dependent on the policy information associated with the second document and the user, to determine that the user is authorized to open the second document, and to provide the second document to the first managed application or the second managed application.

In any of the disclosed embodiments, to detect the request to copy the protected data from the first document to the system clipboard, the instructions may further cause the information handling system to detect a request to copy one or more data objects from the first document to the system clipboard, and to determine, dependent on a data protection policy, that the one or more data objects are classified as protected data, the data protection policy being applicable to documents in the first managed application, documents in applications sourced from a given vendor, a user of the first managed application, a security level associated with the first document, a security level associated with the first managed application, or a data type of the one or more data objects.

In any of the disclosed embodiments, the instructions may further cause the information handling system to provide, to a user of the first managed application, a notification that the request to paste the protected data into the second document was not fulfilled.

In another aspect, a disclosed method is for preventing leakage of protected document data to unsecured applications and documents. The method may include determining that a first document is a protected document in a first managed application, detecting a request to copy protected data from the first document to a system clipboard accessible by unprotected documents, redirecting the protected data to a secure clipboard, the secure clipboard being separate from the system clipboard and inaccessible by unprotected documents, determining that a second document is an unprotected document, detecting a request to paste the protected data into the second document, and refraining from pasting the protected data into the second document.

In any of the disclosed embodiments, the method may further include determining that a third document is a protected document, detecting a request to paste the protected data into the third document, and pasting the protected data from the secure clipboard into the third document.

In any of the disclosed embodiments, the third document may be a protected document in a second managed application different from the first managed application.

In any of the disclosed embodiments, the method may further include detecting a request to copy unprotected data from the second document to the system clipboard, copying the unprotected data to the system clipboard, detecting a request to paste the unprotected data into the first document, and pasting the unprotected data from the system clipboard into the first document.

In any of the disclosed embodiments, the method may further include, prior to detecting the request to copy the protected data from the first document to the system clipboard, redirecting a request to open the first document to a background process that controls access to one or more documents including the first document and the second document, determining policy information associated with the first document and a user of the first managed application on whose behalf the request to open the first document was received, wherein determining that the first document is a protected document in the first managed application is dependent on the policy information associated with the first document and the user, determining that the user is authorized to open the first document, providing the first document to the first managed application, redirecting a request to open the second document in the first managed application or in a second managed application to the background process on behalf of the user, determining policy information associated with the second document and the user, wherein determining that the second document is an unprotected document is dependent on the policy information associated with the second document and the user, determining that the user is authorized to open the second document, and providing the second document to the first managed application or the second managed application.

In any of the disclosed embodiments, detecting the request to copy the protected data from the first document to the system clipboard may include detecting a request to copy one or more data objects from the first document to the system clipboard, and determining, dependent on a data protection policy, that the one or more data objects are classified as protected data, the data protection policy being applicable to documents in the first managed application, documents in applications sourced from a given vendor, a user of the first managed application, a security level associated with the first document, a security level associated with the first managed application, or a data type of the one or more data objects.

In any of the disclosed embodiments, the method may further include providing, to a user of the first managed application, a notification that the request to paste the protected data into the second document was not fulfilled.

In any of the disclosed embodiments, providing the notification may include pasting data representing the notification into the second document in place of the protected data.

In yet another aspect, a disclosed article of manufacture includes a non-transitory, computer-readable memory medium including instructions that, when executed by at least one processor of an information handling system, cause the information handling system to determine that a first document is a protected document in a managed application, to detect a request to copy protected data from the first document to a system clipboard accessible by unprotected documents, to redirect the protected data to a secure clipboard, the secure clipboard being separate from the system clipboard and inaccessible by unprotected documents, to determine that a second document is an unprotected document, to detect a request to paste the protected data into the second document, and to refrain from pasting the protected data into the second document.

In any of the disclosed embodiments, the instructions may further cause the information handling system to determine that a third document is a protected document, to detect a request to paste the protected data into the third document, and to paste the protected data from the secure clipboard into the third document.

In any of the disclosed embodiments, the instructions may further cause the information handling system to detect a request to copy unprotected data from the second document to the system clipboard, to copy the unprotected data to the system clipboard, to detect a request to paste the unprotected data into the first document, and to paste the unprotected data from the system clipboard into the first document.

In any of the disclosed embodiments, prior to detecting the request to copy the protected data from the first document to the system clipboard, the instructions may further cause the information handling system to redirect a request to open the first document to a background process that controls access to one or more documents including the first document and the second document, to determine policy information associated with the first document and a user of the first managed application on whose behalf the request to open the first document was received, wherein determining that the first document is a protected document in the first managed application is dependent on the policy information associated with the first document and the user, to determine that the user is authorized to open the first document, to provide the first document to the first managed application, to redirect a request to open the second document in the first managed application or in a second managed application to the background process on behalf of the user, to determine policy information associated with the second document and the user, wherein determining that the second document is an unprotected document is dependent on the policy information associated with the second document and the user, to determine that the user is authorized to open the second document, and to provide the second document to the first managed application or the second managed application.

In any of the disclosed embodiments, the instructions may further cause the information handling system to provide, to a user of the first managed application, a notification that the request to paste the protected data into the second document was not fulfilled.

In any of the disclosed embodiments, the instructions may further cause the information handling system to launch a data protection client process in response to initiation of a user session on behalf of a user of the first managed application, and to implement, by the data protection client process during the user session, the secure clipboard.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
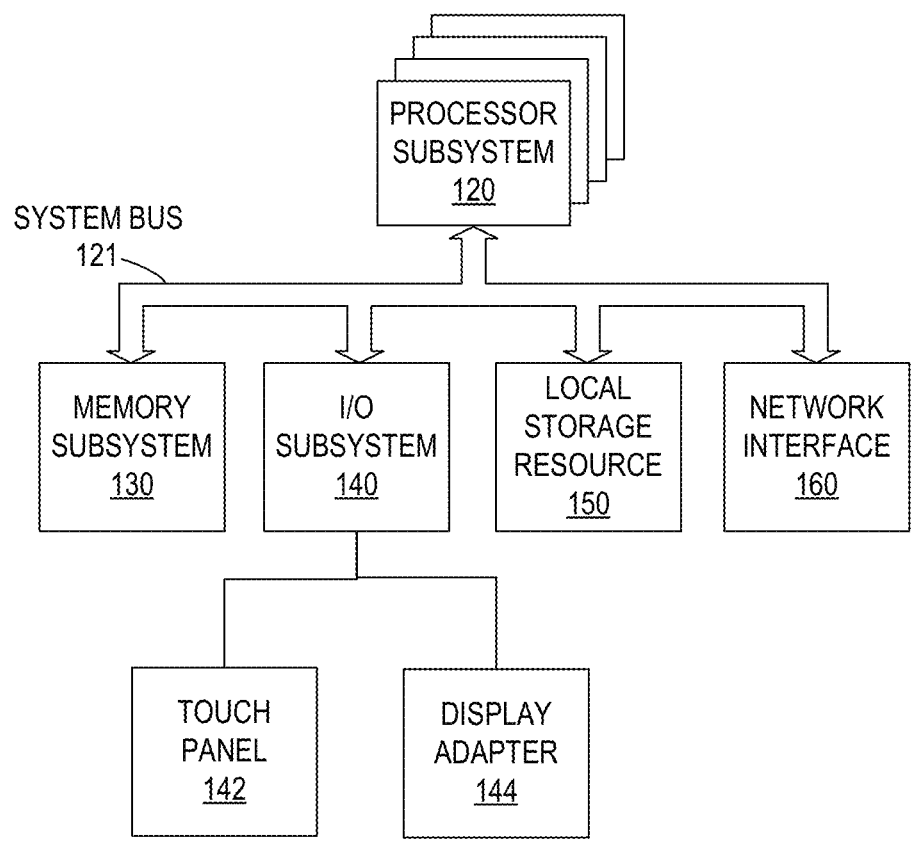
FIG. 1 is a block diagram illustrating an example information handling system, according to some embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. For example, computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD), and/or any combination of the foregoing.

As will be described in further detail, the inventors of the present disclosure have developed systems and methods disclosed herein for preventing data leakage from protected applications and documents to unsecured applications and documents through an operating system clipboard. In some existing systems, in order to prevent leakage of protected data, the applications that generate protected documents are prevented from accessing the system clipboard at all. In other existing systems, custom versions of the applications that generate protected documents do not allow copying. In such systems, the protected documents can only be viewed and/or edited using the custom software. In some embodiments of the present disclosure, the systems and methods described herein may, through management of commercially available third-party applications, allow protected data to be exchanged between protected documents through a secure clipboard that is separate from the operating system clipboard while preventing the protected data from reaching unprotected documents or unprotected applications.

In some embodiments, the systems and methods described herein may allow a managed application with a given active (e.g., open) protected document to seamlessly use clipboard functionality to copy data from the given active document to another protected document in the same application or in any other managed application within the same user session or context. Clipboard related functions, including copy type functions and paste type functions (e.g., for performing copy/paste or cut/paste operations), may be intercepted by a data leakage prevention client transparent to the applications themselves and to users of the applications. If a copy type function is used to copy protected data, the protected data may be copied to a secure clipboard that is not accessible by unprotected documents and unmanaged applications rather than to the system clipboard implemented by the operating system. In this way, the systems and methods described herein may prevent protected data copied from a document in a managed application to be available, in any way, to an unprotected document or an unmanaged application. In some embodiments, the disclosed systems and methods may allow unprotected data to be copied into the system clipboard from any source and to be pasted into a protected document in a managed application or into an unprotected document. In some embodiments, and under certain circumstances, the disclosed systems and methods may, optionally, prevent a managed application from being able to employ clipboard functionality at all. In various embodiments, the managed applications to which the data leakage prevention techniques described herein are applied may include, but are not limited to, commercially available applications usable to generate, view, and/or edit documents or files of a variety of different types, such as word processing applications, presentation applications, spreadsheet applications. In some embodiments, the managed applications may include one or more of the applications within the Microsoft® Office® suite of office productivity software released by Microsoft Corporation for execution on information handling systems running the Microsoft® Windows® operating system or another operating system. In some embodiments, the managed applications may include one or more desktop publishing applications or document creation, viewing, and/or editing applications developed by Adobe Systems Incorporated.

Particular embodiments are best understood by reference to FIGS. 1, 2, 3, 4, and 5, wherein like numbers are used to indicate like and corresponding parts.

Turning now to the drawings, FIG. 1 illustrates a block diagram depicting selected elements of an example information handling system, according to some embodiments. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown).

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, one or more local storage resources 150, and a network interface 160. System bus 121 may represent a variety of suitable types of bus structures, e.g., a memory bus, a peripheral bus, or a local bus using various bus architectures in selected embodiments. For example, such architectures may include, but are not limited to, a Micro Channel Architecture (MCA) bus, an Industry Standard Architecture (ISA) bus, an Enhanced ISA (EISA) bus, a Peripheral Component Interconnect (PCI) bus, a PCI-Express bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to, transmission protocols and/or standards enumerated below with respect to the discussion of network 155. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), a USB interface, an Institute of Electrical and Electronics Engineers (IEEE) 1394 interface, a Thunderbolt interface, a serial storage architecture (SSA), integrated drive electronics (IDE), and/or any combination thereof. The network coupled to network interface 160 and/or various components associated therewith may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource accessed through network interface 160, not shown).

Also in FIG. 1, memory subsystem 130 may comprise a system, device, or apparatus operable to retain and/or retrieve program instructions and/or data for a period of time (e.g., computer-readable media). Memory subsystem 130 may comprise RAM, DRAM (dynamic RAM), EDO RAM (extended data out RAM), SRAM (static RAM), programmable ROM (PROM), erasable PROM (EPROM), EEPROM, NVRAM (non-volatile RAM), ferroelectric RAM (FRAM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, a magnetic tape, flash memory, EEPROM, and/or another type of solid state storage media) and may be generally operable to store instructions and/or data.

In system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display device that is driven by display adapter 144. It is noted that when information handling system 100 is a laptop computer with an integrated display device, display adapter 144 may provide connectivity for an external display.

In some embodiments, processor 120 and one or more other components of information handling system 100 may be included in a system-on-chip (SoC). For example, the SoC may include processor 120 and a platform controller hub (not specifically illustrated in FIG. 1).

As will be described in further detail herein, information handling system 100 (or multiple instances of information handling system 100 that are communicatively coupled to each other) may support the techniques described herein for preventing leakage of protected document data to unsecured applications and documents.

In some embodiments, the systems described herein may include a data leakage prevention (DLP) client, which is a user-mode client responsible for injecting code into managed applications to implement secure clipboard functionality, an application management service and associated application management service drivers, which implement the management of protected documents for managed applications, and a management server. In some embodiments, the management server may be a remote server that manages protected document access, provides an audit trail for clipboard type operations involving protected data, and allows system administrators to dictate and enforce particular data leakage prevention policies for their organization. For example, the data leakage prevention policies may specify particular types of documents, or document attributes thereof, that lead to a given document being classified as a protected document. In another example, the data leakage prevention policies may specify that particular data objects, or data object of particular data types, should be are classified as protected data.

More specifically, the application management service and associated drivers may be responsible for managing which applications are allowed to open particular protected documents, seamlessly decrypting the corresponding files for the applications, and communicating this information to the DLP client. In order to implement a secure clipboard, the DLP client employ the concepts of DLL (dynamic-link library) injection and API (application programming interface) hooking. DLL injection is a process by which an application can cause a DLL to be loaded into the memory space of a target managed application. Once a DLL is successfully loaded, it is possible for the DLP client to interact with the target managed application. API hooking is a technique used to intercept function calls made by the managed application into the operating system or another component to modify the behavior resulting from the function call. In some embodiments, the use of API hooking allows the DLP client to add functionality to or change the behavior of a managed application without the managed application being aware of the additional functionally or changed behavior. In various embodiments, API hooking may employ memory break points, jump instructions, data execution prevention features, or other suitable techniques to modify the behavior of a managed application in response to an intercepted function call.

By combining DLL injection and API hooking, the DLP client may be able to intercept all clipboard related function calls made by a managed application into the operating system, including various copy type operations (which may include cut type operations) and various paste type operations. When a function call for a copy type operation on a protected document in a managed application is detected, the DLP client may intercept the function call through API hooking and extract the protected data that is copied (which would otherwise be directed to the system clipboard), while preventing other applications (or unprotected documents thereof) from accessing the protected data. Once the protected data is extracted, the DLP client may direct the protected data to a private secure clipboard that is implemented by the DLP client and that is accessible only to other managed applications. When a managed application employs a function call into the operating system for a paste type operation of protected data that was copied or cut from a protected document, the DLP client may intercept the function call through API hooking. If a secure clipboard is present and contains the protected data to be pasted, and if the protected data is to be pasted into a protected document, the DLP client may seamlessly present the protected data to the managed application for pasting. Using this approach, the managed applications may not be aware that a secure clipboard was employed in the copy/paste operation instead of the system clipboard. Since, using the techniques described herein, the system clipboard implemented by the operating system does not store any protected data and unmanaged applications cannot access the secure clipboard, unmanaged applications and their unprotected documents will never see protected data that was copied from a protected document in a managed application, nor will they be able to access such data for pasting from any clipboard. In other words, the secure clipboard may work alongside the system clipboard implemented by the operating system such that it appears as if there is only a single clipboard, and particular data objects may be held by at most one of the two clipboards at a time.

Figure 2:
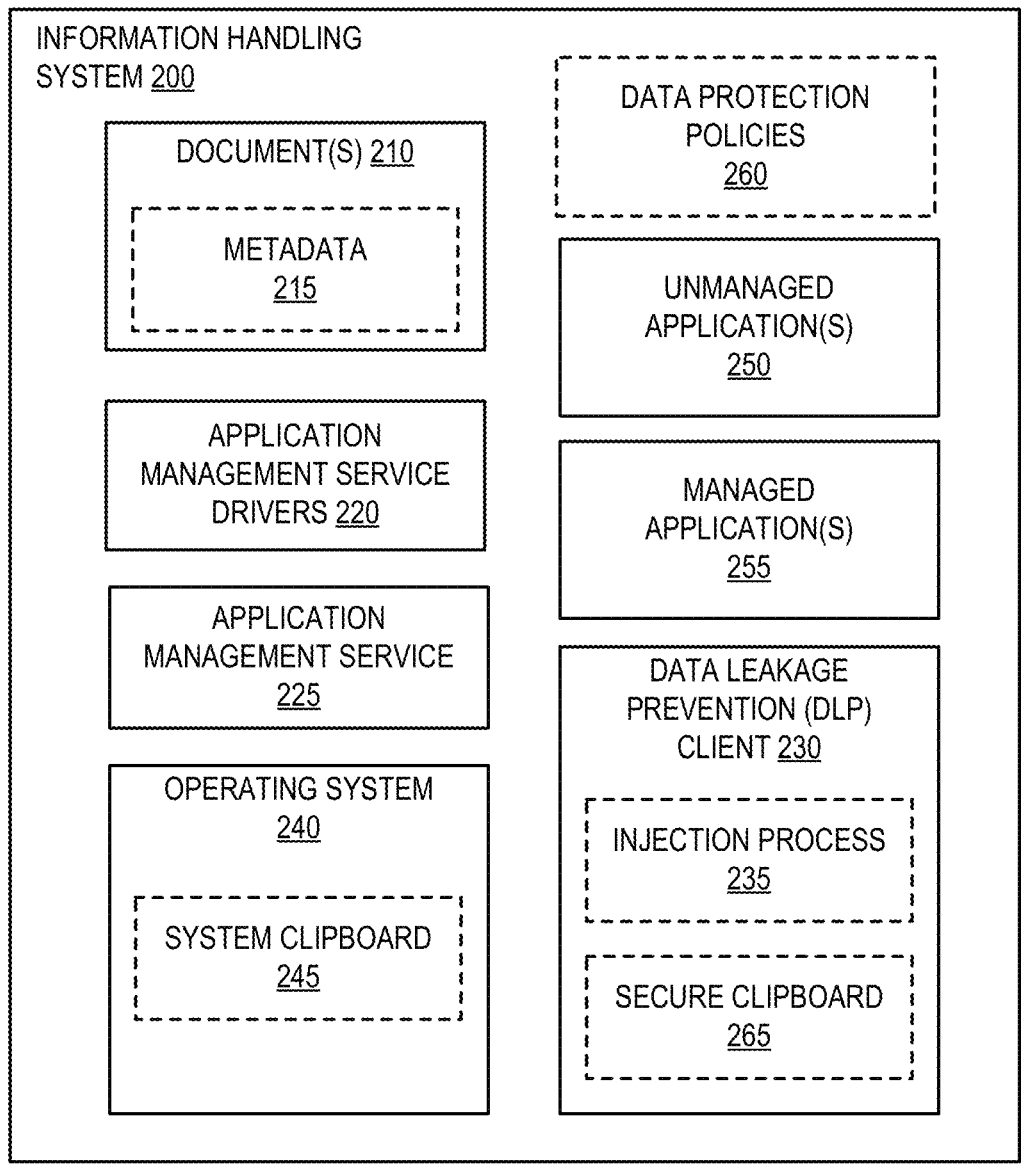
FIG. 2 is a block diagram illustrating selected elements of an embodiment of an information handling system that implements data leakage prevention for protected document data.

Turning now to FIG. 2, a block diagram illustrating selected elements of an embodiment of an information handling system 200 that implements data leakage prevention for protected document data is shown. Information handling system 200 may include additional elements similar to those of information handling system 100 illustrated in FIG. 1 (not shown). In the illustrated embodiment, information handling system 200 includes an operating system 240 that implements respective instances of a system clipboard 245 for various user sessions or other execution contexts. Information handling system 200 also includes one or more unmanaged applications 250 and one or more managed applications 255 that are installed in and/or executing on information handling system 200. In the illustrated embodiment, information handling system 200 also includes an application management service 225 and associated application management service drivers 220, such as those described above. In at least some embodiments, the application management service 225 may execute as a background process to manage access to protected documents by managed applications 255. Information handling system 200 also includes a data leakage prevention (DLP) client 230 that, as described herein, implements an injection process to modify the behavior of various managed applications 255 in response to intercepted clipboard related function calls. DLP client 230 also implements respective instances of a secure clipboard 265 on behalf of managed applications 255 for various user sessions or other execution contexts.

In the illustrated embodiment, information handling system 200 includes one or more documents 210, some of which may be protected documents such as encrypted documents or documents containing encrypted or otherwise protected data objects, and some of which may be unprotected documents which are not encrypted and do not contain any encrypted or otherwise protected data objects. Each document 210 may include or otherwise be associated with metadata 215. In some embodiments, metadata 215 may include information indicative of a security level (e.g., "confidential" or "top secret") or data protection policy associated with the document. For example, in some embodiments, an identifier of an encryption key associated with a document 210 may be encoded to indicate the security level of the document 210. In some embodiments, metadata 215 may indicate whether or not the corresponding document 210 is encrypted or may provide information about a method or key with which the document was encrypted. In various embodiments, an unprotected document 210 may be generated, viewed, and/or edited by one or more of unmanaged applications 250, while a protected document 210 may only be generated, viewed, and/or edited by one or more managed applications 255. In the illustrated embodiment, information handling system 200 includes one or more data protection policies 260 which may be accessed by application management service 225 for use in determining whether a given user has access rights to particular managed applications 255 and/or protected documents 210 in the particular managed applications 255.

In various embodiments, documents 210 may be resident, at least temporarily, in local memory on information handling system 200, such as in a memory subsystem or local storage resource similar to memory subsystem 130 and local storage resource 150 illustrated in FIG. 1, respectively. In some embodiments, documents 210 may be resident, at least temporarily, in a remote storage device, such as in a network storage resource, or on another information handling system accessed through a network interface similar to network interface 160 illustrated in FIG. 1. In various embodiments, any or all of application management service 225, application management service drivers 220, operating system 240, unmanaged applications 250, managed applications 255 and/or DLP client 230 may be resident, at least temporarily, in local memory on information handling system 200, such as in a memory subsystem or local storage resource similar to memory subsystem 130 and local storage resource 150 illustrated in FIG. 1, respectively. In some embodiments, application management service 225, application management service drivers 220, operating system 240, unmanaged applications 250, managed applications 255 and/or DLP client 230 (or portions thereof) may be resident, at least temporarily, in a remote storage device, such as in a network storage resource, or on another information handling system accessed through a network interface similar to network interface 160 illustrated in FIG. 1. Similarly, while data protection policies 260 are shown in FIG. 2 as being resident on information handling system 200, in other embodiments, data protection policies 260 may be stored on a management server, which may be remote to information handling system 200.

In some embodiments, a given document 210 may be selected to be opened in a managed application 255. For example, a user who is currently logged into information handling system 200 may select an icon that is associated with the given document 210 in user interface presented on a display device, such as a touch panel 142 or another type of internal or external display device that is driven by a display adapter 144. For instance, the user may double click on the icon that is associated with the given document 210. In some embodiments, when the given document 210 is selected to be opened, a request to open the given document 210 may be generated. In some embodiments, the given document 210 may be or include a file.

In some embodiments, the request to open the given document 210 may be redirected to application management service 225 by an application management service driver 220 that intercepts the request to open the given document 210. In some embodiments, application management service driver 220 may provide information associated with the request to open the given document 210 to application management service 225. For example, the information associated with the request to open the given document 210 may include one or more of a filename, a path to the given document 210, and an application associated with the given document 210 (such as one of managed applications 255). In some embodiment, the application management service 225 may determine whether the user on whose behalf the request to open the given document 210 was received has access rights to open the document or is otherwise authorized to open the document for viewing and/or editing based at least on policy or access information associated with the user, the given document 210, or the managed application 255 in which the given document 210 is to be opened and/or based on any applicable data leakage prevention policies 260. In embodiments in which the given document 210 is encrypted, determining whether the user is authorized to open the given document 210 may include determining whether the user has a suitable key for decrypting the given document 210. In some embodiments, application management service 225 may be or include a Windows® service of the Windows operating system. In some embodiments, application management service 225 may be or include a daemon. For example, the daemon may be a background process of a Unix operating system or a Unix-like operating system.

In some embodiments, application management service 225 may initiate an injection process 235 by DLP client 230 if injection process 235 has not yet been started. In some embodiments, application management service 225 may provide policy information associated with the given document 210 to DLP client 230. For example, in some embodiments, metadata 215 may include, or be indicative of, some or all of the policy information and application management service 225 may retrieve metadata 215 from the given document 210. In some embodiments, application management service 225 may obtain some or all of the policy information, or data indicative of the policy information, from data protection policies 260. Application management service 225 may determine the policy information from metadata 215 and/or data protection policies 260.

In some embodiments, DLP client 230 may query application management service 225 to determine whether the given document 210 is a protected document for which the data leakage prevention techniques described herein should be applied. For example, the query may include a request for information that may be utilized in determining whether the given document 210 is a protected document or includes data that should be protected. In one example, application management service 225 may determine if the given document 210 includes data that should be protected based at least on metadata 215. In another example, application management service 225 may determine if the given document 210 is encrypted. For instance, if the given document 210 is encrypted, then the given document 210 may be assumed to include data that should be protected. In some embodiments, if the given document 210 includes data that should be protected, application management service 225 may provide information to DLP client 230 that indicates that the given document 210 includes data that should be protected. For example, determining whether the given document 210 is a protected document and/or that one or more particular data objects within given document 210 should be are classified as protected data may be dependent on a data protection policy 260 that is applicable to documents in the managed application 255 in which the given document 210 was opened, documents in applications sourced from a given vendor, access rights of the user on whose behalf the given document 210 was opened, a security level associated with the given document 210, a security level associated with the managed application 255 in which the given document 210 was opened, and/or a data type of the particular data objects, in various embodiments.

It if is determined that the given document 210 is a protected document or includes data that should be protected, the DLP client 230 may start injection process 235 and/or may instantiate a secure clipboard 265 for the current user session or context, if a secure clipboard 265 has not yet been instantiated for the current user session or context. Subsequently, when and if the DLP client 230 detects an operation to copy protected data from a protected document 210 in a managed application 255, the copied data may be redirected to the secure clipboard 265. When and if the DLP client 230 detects an operation to paste the data that was copied to the secure clipboard 265 to an unprotected document 210 in an unmanaged application 250 or in a managed application 255, the data will not be provided to the application in which the unprotected document 210 is open for pasting. In some embodiments, rather than providing the data that was copied to the secure clipboard 265 to the unprotected document 210, the DLP client may instead provide to the application in which the unprotected document 210 was opened data representing a notification that the paste operation is not allowed, and the notification may be pasted into the unprotected document 210 in place of the data copied to the secure clipboard 265.

Figure 3:
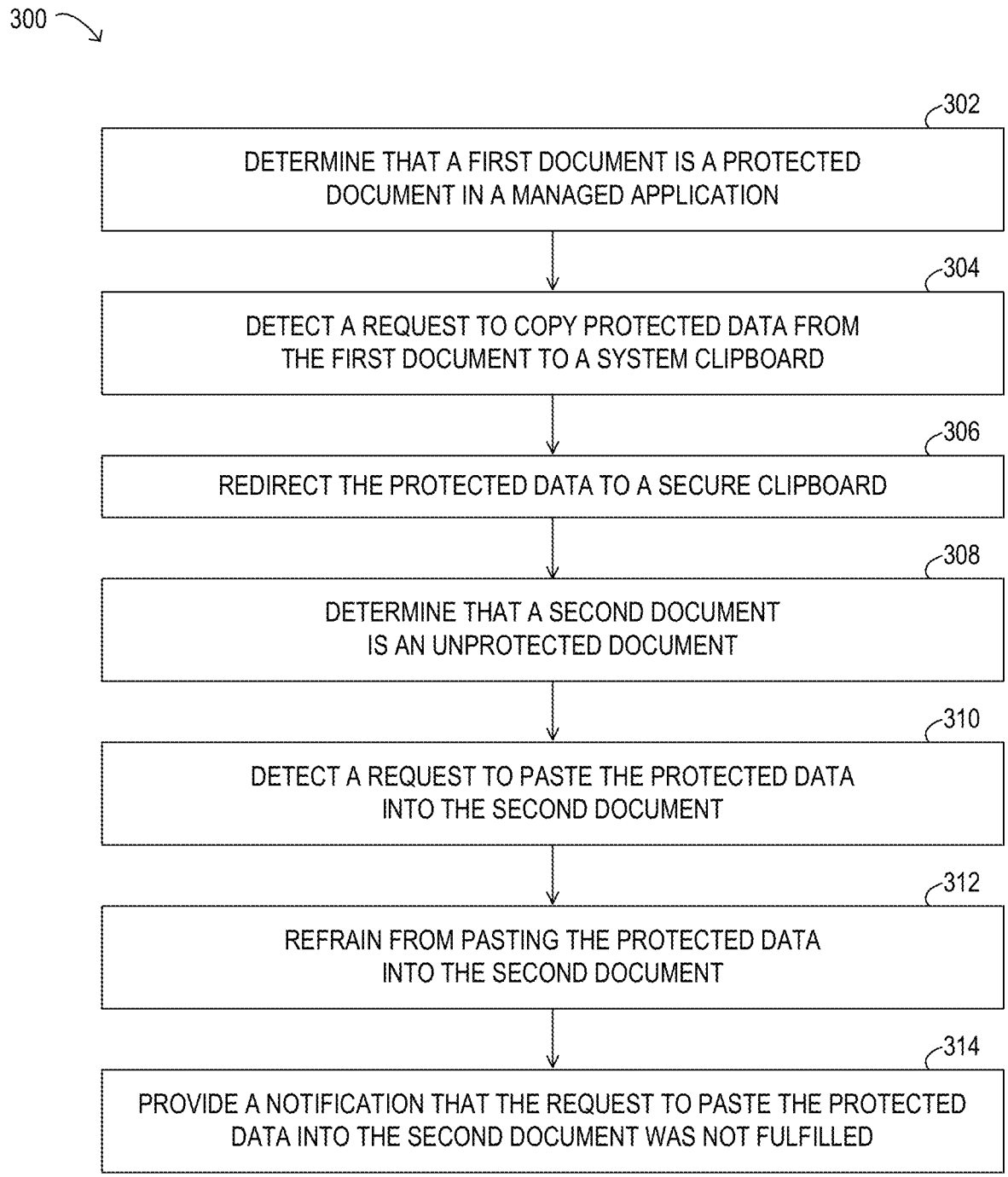
FIG. 3 illustrates selected elements of an embodiment of a method for preventing leakage of protected document data, as described herein.

Referring now to FIG. 3, a block diagram of selected elements of an embodiment of a method for preventing leakage of protected document data, as described herein, is depicted in flowchart form. In various embodiments, method 300 may be performed by one or more instances of an information handling system (such as information handling system 100 illustrated in FIG. 1, information handling system 200 illustrated in FIG. 2, and information handling system 400 illustrated in FIG. 4). It is noted that certain operations described in method 300 may be optional or may be rearranged in different embodiments.

As illustrated in FIG. 3, method 300 may begin, at 302, by determining that a first document is a protected document in a managed application. For example, the method may include determining that the first document is an encrypted document or that it contains encrypted or otherwise protected data objects.

At 304, method 300 may include detecting a request to copy protected data from the first document to a system clipboard. For example, a DLP client (such as DLP client 230 illustrated in FIG. 2) may intercept all clipboard related APIs called by managed applications into the operating system and may determine that one of these intercepted APIs represents a request to copy protected data from a protected document. The request may represent a copy/paste type operation or a cut/paste type operation, in different embodiments. At 306, the method may include redirecting the protected data to a secure clipboard. For example, in response to detecting a request to copy protected data from the first document, the DLP client may redirect the protected data to a secure clipboard implemented by the DLP client for a current user session or context.

At 308, the method may include determining that a second document is an unprotected document. For example, the method may include determining that the second document is not encrypted and does not contain any encrypted or otherwise protected data objects. In various embodiments, the second document may be an unprotected document in the same managed application as the first document or in a different managed application than the first managed application.

At 310, method 300 may include detecting a request to paste the protected data into the second document. For example, the DLP client may determine that one of the intercepted clipboard related APIs represents a request to paste protected data into the unprotected second document. At 312, the method may include refraining from pasting the protected data into the second document. At 314, method 300 may include providing a notification to the user on whose behalf the request was made that the request to paste the protected data into the second document was not fulfilled. In some embodiments, providing the notification may include pasting data representing the notification into the second document in place of the protected data. In other embodiments, providing the notification may include generating an alert tone in the information handling system or displaying an alert icon, a pop-up window containing the notification, or another user interface element indicating that the requested paste operation was not performed and/or that it was not an authorized operation in a user interface of an internal or external display device of the information handling system. In various embodiments, some or all of the operations illustrated in FIG. 3 may be repeated, as appropriate, in response to detecting additional copy/paste type operations in which an attempt is made to copy protected data to an unprotected document.

Figure 4:
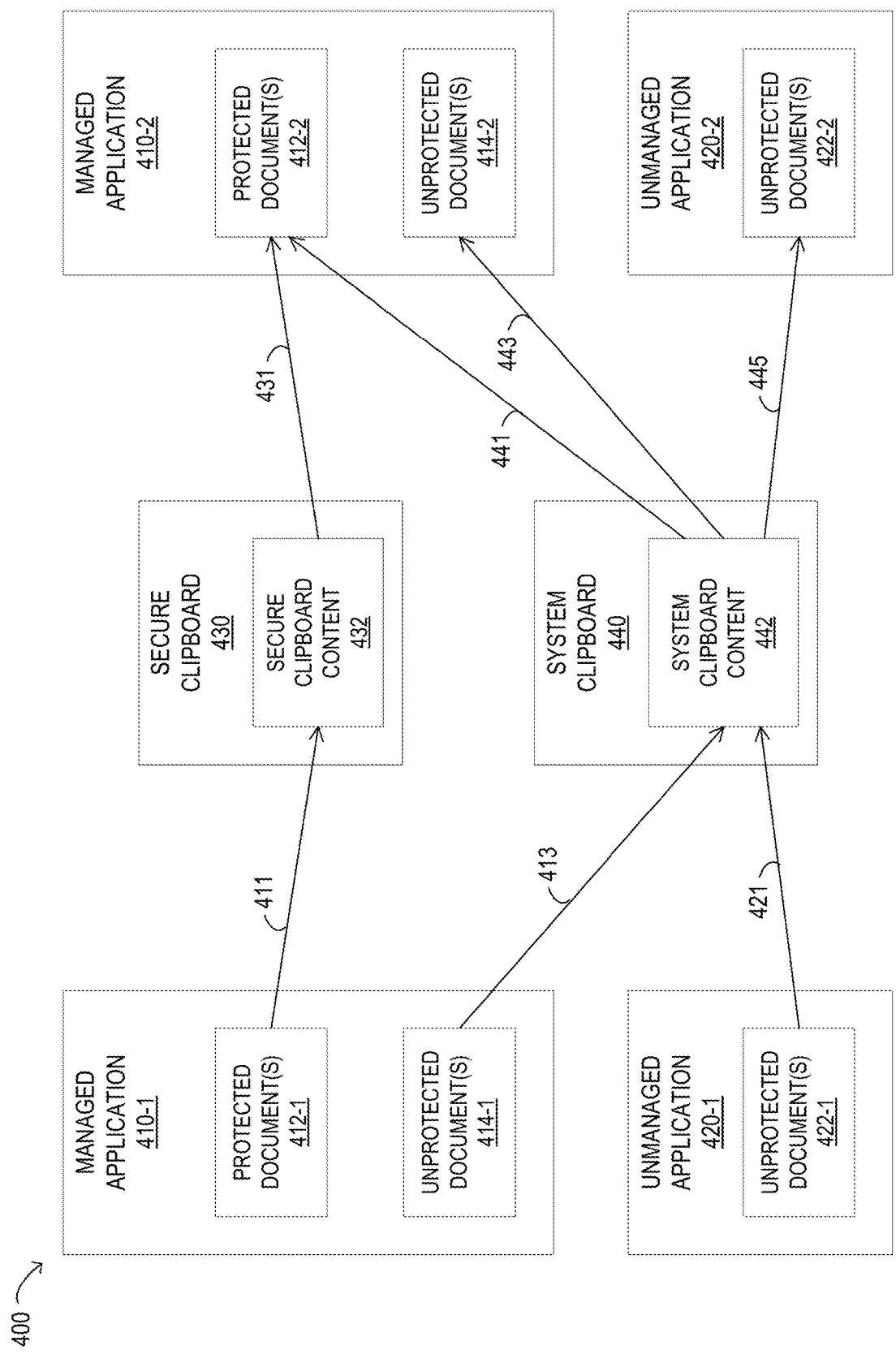
FIG. 4 is a block diagram illustrating the operation of selected elements of an embodiment of an information handling system that implements data leakage prevention for protected document data.

Referring now to FIG. 4, a block diagram illustrating the operation of selected elements of an information handling system 400 that implements data leakage prevention for protected document data is depicted, according to some embodiments. Information handling system 400 may include additional elements similar to those of information handling system 100 illustrated in FIG. 1 and/or information handling system 200 illustrated in FIG. 2 (not shown). In some embodiments, any or all of the elements illustrated in FIG. 4 may be resident, at least temporarily, in local memory on information handling system 400, such as in a memory subsystem or local storage resource similar to memory subsystem 130 and local storage resource 150 illustrated in FIG. 1, respectively. In some embodiments, any or all of the elements illustrated in FIG. 4 may be resident, at least temporarily, in a remote storage device, such as in a network storage resource, or on another information handling system accessed through a network interface similar to network interface 160 illustrated in FIG. 1. In the illustrated example, information handling system 400 includes one or more protected documents 412 and one or more unprotected documents 414 in each of two managed applications. In addition, information handling system 400 includes one or more unprotected documents 422 in each of two managed applications 420. In the illustrated example, information handling system 400 includes (for a given user session/context) a system clipboard 440 into which various applications copy system clipboard content 422, some of which may be subsequently pasted into the same document from which it was copied or into another document, information handling system 400 includes (for the given user session/context) a secure clipboard 430 into which various applications copy secure clipboard content 432, some of which may be subsequently pasted into the same document from which it was copied or into another document.

In the illustrated embodiment, in response to a request to copy protected data from one of protected documents 412-1 in managed application 410-1 to system clipboard 440, the copied protected data is redirected (as shown at 411) by the DLP client to secure clipboard 430 and copied into secure clipboard content 432. In response to a request to copy unprotected data from one of unprotected documents 414-1 in managed application 410-1 to system clipboard 440, the unprotected data is copied (as shown at 413) into system clipboard content 442 without redirection by the DLP client. Similarly, in response to a request to copy unprotected data from one of unprotected documents 422-1 in unmanaged application 420-1 to system clipboard 440, the unprotected data is copied (as shown at 421) into system clipboard content 442 without redirection by the DLP client.

In the illustrated embodiment, in response to a request to paste protected data copied from one of protected documents 412-1 (which was redirected to secure clipboard 430 transparently to the user) into one of protected documents 412-2 in managed application 410-2, the protected data is provided (as shown at 431) to the protected document 412-2 by the DLP client from secure clipboard 430. In response to a request to paste unprotected data copied from one of unprotected documents 414-1 or one of unprotected documents 422-1 (which was copied to system clipboard 440) into one of protected documents 412-2 in managed application 410-2, the unprotected data is provided (as shown at 441) to the protected document 412-2 from system clipboard 440 without interference by the DLP.

In response to a request to paste unprotected data copied from one of unprotected documents 414-1 or one of unprotected documents 422-1 (which was copied to system clipboard 440) into one of unprotected documents 414-2 in managed application 410-2, the unprotected data is provided (as shown at 443) to the unprotected document 414-2 by the operating system from system clipboard 440 without interference by the DLP. Similarly, in response to a request to paste unprotected data copied from one of unprotected documents 414-1 or one of unprotected documents 422-1 (which was copied to system clipboard 440) into one of unprotected documents 422-2 in unmanaged application 420-2, the unprotected data is provided (as shown at 445) to the unprotected document 422-2 from system clipboard 440 without interference by the DLP.

Figure 5:
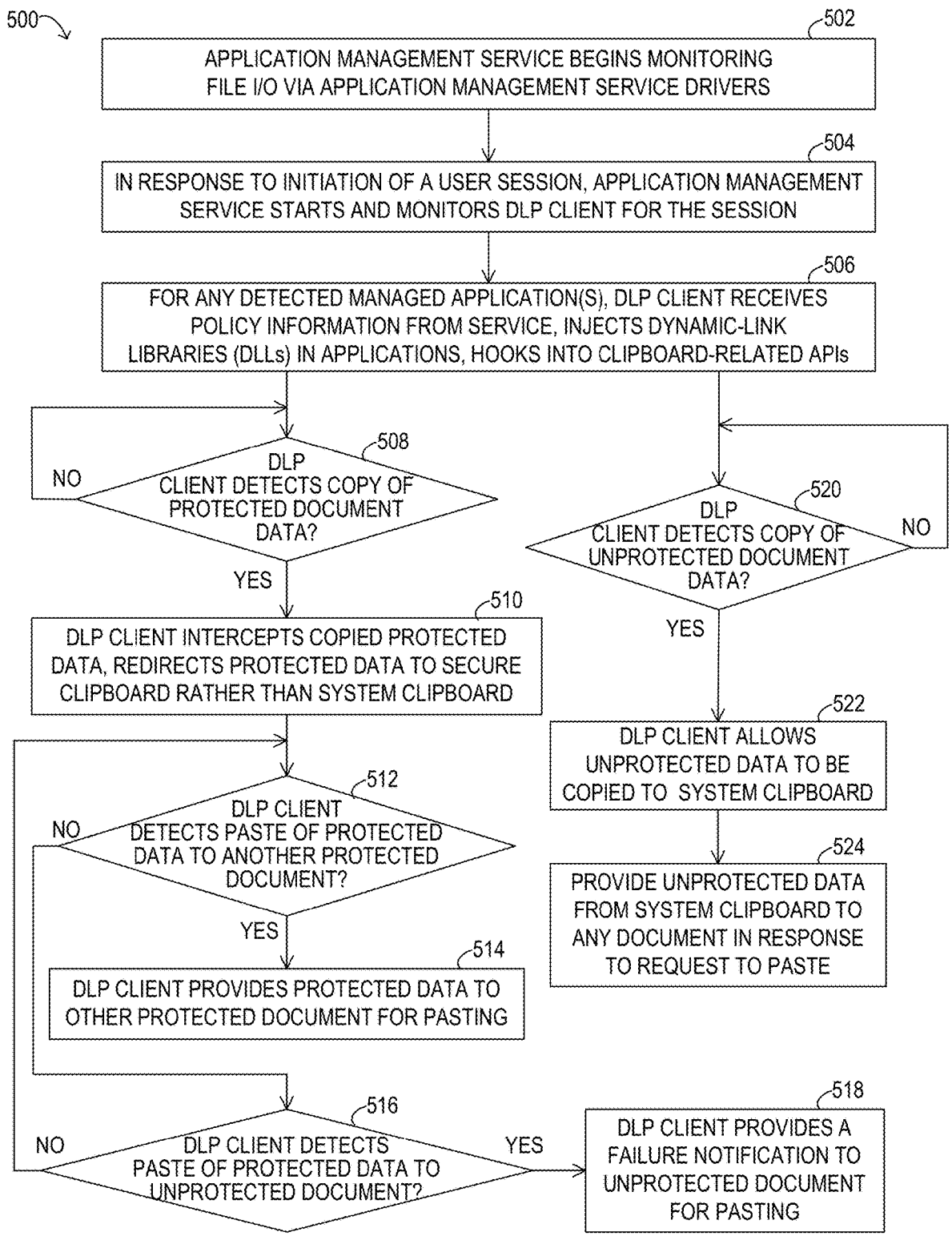
FIG. 5 illustrates selected elements of an embodiment of a method for preventing data leakage from protected documents in managed applications.

Referring now to FIG. 5, a block diagram of selected elements of an embodiment of method for preventing data leakage from protected documents in managed applications, as described herein, is depicted in flowchart form. In various embodiments, method 500 may be performed by one or more instances of an information handling system 100 (see FIGS. 1 and 2). It is noted that certain operations described in method 500 may be optional or may be rearranged in different embodiments.

As illustrated in FIG. 5, method 500 may begin, at 502, when an application management service, such as application management service 225 illustrated in FIG. 2, begins monitoring file system I/O in an information handling system via application management service drivers, such as application management service drivers 220. For example, in some embodiments the application management service and associated application management service drivers may be activated at startup of the information handling system and the application management service may begin monitoring file system I/O for all possible managed applications through the associated application management service drivers.

At 504, method 500 may include, in response to the initiation of a user session, the application management service starting and monitoring a DLP client, such as DLP client 230 illustrated in FIG. 2, for the user session. For example, when a user logs into the information handling system, application management service may launch an instance of the DLP client for the benefit of any managed applications executed by the user during the user session.

At 506, the method may include, for any detected managed application(s), the DLP client receiving policy information from the application management service, injecting one or more dynamic-link libraries (DLLs) into the detected managed applications, and hooking into clipboard-related APIs in the detected managed applications to enable the data leakage prevention techniques described herein. As described above, the DLP client may receive policy information from the application management service. For example, the application management service may provide the DLP client with information indicating whether or not a managed application currently has an active, or open, protected document. In some embodiments, the application management service may provide the unique process identifier assigned to each managed application by the operating system for each managed application for which the DLP client is to apply the injection and API hooking techniques described herein.

In some embodiments, an administrator of one or more information handling systems used by members of an organization may dictate particular data leakage prevention policies to be enforced for their organization. A data leakage prevention policy may specify the types of data objects that should be considered protected or the document attributes that indicate a document should be considered protected. In one example, a data leakage prevention policy may specify that data copied from documents with a security level of "confidential" in a managed application can be pasted into other documents with a security level of "confidential" or higher, but that data copied from a document with a security level of "top secret" cannot be pasted into any other document regardless of its security level. In another example, a data leakage prevention policy may specify that image data or data representing a social security number or other sensitive or private information that is copied from a document in a managed application should be considered protected data and should not be pasted into an unprotected document. In yet another example, a data leakage prevention policy may specify that documents in an archival format, such as the Portable Document Format (PDF) developed by Adobe Systems, should be classified as protected documents. In general, an administrator may specify data leakage prevention policies that are dependent on any attributes associated with particular users, documents or managed applications in the information handling system.

If and when (at 508), the DLP client detects a request to copy protected document data to the system clipboard, method 500 may proceed to 510. At 510, the method may include the DLP client intercepting the copied protected data and redirecting the protected data to a secure clipboard rather than to the system clipboard, as described herein.

If, at 512, the DLP client detects a request to paste the protected data to another protected document, method 500 may continue to 514. Otherwise, method 500 may proceed to 516. At 514, the method may include the DLP client providing the protected data to the other protected document for pasting. In some embodiments, protected data copied from any document in a managed application can be pasted into protected documents in the same managed application or in any other managed application within the same user session or context. In other embodiments, a data leakage prevention policy may specify that protected data copied from documents in a first managed application (e.g., a spreadsheet application) cannot be copied to protected documents in a second managed application (e.g., a presentation or word processing application) based on an organizational policy specifying the particular types of data sharing operations that are allowed between protected documents and managed applications.

If and when (at 516), the DLP client detects a request to paste the protected data to an unprotected document, method 500 may continue to 518. Otherwise, method 500 may return to 512. At 518, the method may include the DLP client refraining from providing the protected data to the unprotected document for pasting into the unprotected document, but instead providing a notification that the requested paste operation failed and/or was unauthorized for pasting into the unprotected document. For example, the DLP client may provide a notification stating, "invalid operation", "pasting protected data into this document is not allowed by your organization", or any standard or customizable message selected by an administrator and/or specified in an applicable data leakage prevention policy.

If and when (at 520), the DLP client detects a request to copy unprotected document data to the system clipboard, method 500 may proceed to 522. The request may be directed to any unprotected document (or particular data objects thereof) in any managed or unmanaged application, in different embodiments. At 522, method 500 may include the DLP client allowing the unprotected data to be copied to the system clipboard without redirection.

Subsequently, at 524, the method may include providing the unprotected data from the system clipboard to any given document in response to a request to paste the unprotected data into the given document. For example, in some embodiments the request may be directed to any unprotected or protected document in any managed or unmanaged application.

In various embodiments, some or all of the operations illustrated in FIG. 5 may be repeated, as appropriate, to prevent the leakage of protected document data in the information handling system during the same user session or during another user session for the same or a different user.

As described in detail herein, the disclosed systems and methods may allow a managed application with a protected document to seamlessly use clipboard functionality to copy data from the protected document to another protected document in the same application or in another managed application within the same user session or context. Clipboard related functions, including copy type functions and paste type functions may be intercepted by a data leakage prevention client transparent to the applications themselves and to users of the applications. If a copy type operation is used to copy protected data, the protected data may be copied to a secure clipboard that is not accessible by unprotected documents and unmanaged applications rather than to the system clipboard implemented by the operating system. In this way, the systems and methods described herein may prevent protected data copied from a document in a managed application to be available, in any way, to an unprotected document or an unmanaged application. The managed applications to which the data leakage prevention techniques described herein are applied may include any applications usable to generate, view, and/or edit documents or files of a variety of different types, such as word processing applications, presentation applications, spreadsheet applications.

In some embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to some embodiments. Moreover, one or more of system elements may be omitted and/or additional system elements may be added as desired, according to some embodiments.

In some embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a non-transitory memory medium, coupled to the at least one processor, storing instructions that when executed by the at least one processor, cause the information handling system to:
   redirect a request to open a first document to a background process that controls access to one or more documents including the first document and a second document;
   determine policy information associated with the first document and a user of a first managed application on whose behalf the request to open the first document was received;
   determine, dependent on the policy information associated with the first document and the user, that the first document is a protected document in the first managed application;
   determine that the user is authorized to open the first document;
   provide the first document to the first managed application;
   redirect a request to open the second document in the first managed application or in a second managed application to the background process on behalf of the user;
   determine policy information associated with the second document and the user;
   determine, dependent on the policy information associated with the second document and the user, that the second document is an unprotected document;
   determine that the user is authorized to open the second document;
   provide the second document to the first managed application or the second managed application;
   detect a request to copy protected data from the first document to a system clipboard accessible by unprotected documents;
   redirect the protected data to a secure clipboard, the secure clipboard being separate from the system clipboard and inaccessible by unprotected documents;
   detect a request to paste the protected data into the second document; and
   refrain from pasting the protected data into the second document.

2. The information handling system of claim 1, wherein the instructions further cause the information handling system to:
   determine that a third document is a protected document;
   detect a request to paste the protected data into the third document; and
   paste the protected data from the secure clipboard into the third document.

3. The information handling system of claim 1, wherein the instructions further cause the information handling system to:

detect a request to copy unprotected data from the second document to the system clipboard;
copy the unprotected data to the system clipboard;
detect a request to paste the unprotected data into the first document; and
paste the unprotected data from the system clipboard into the first document.

4. The information handling system of claim 1, wherein to detect the request to copy the protected data from the first document to the system clipboard, the instructions further cause the information handling system to:
detect a request to copy one or more data objects from the first document to the system clipboard; and
determine, dependent on a data protection policy, that the one or more data objects are classified as protected data, the data protection policy being applicable to documents in the first managed application, documents in applications sourced from a given vendor, the user of the first managed application, a security level associated with the first document, a security level associated with the first managed application, or a data type of the one or more data objects.

5. The information handling system of claim 1, wherein the instructions further cause the information handling system to provide, to the user of the first managed application, a notification that the request to paste the protected data into the second document was not fulfilled.

6. A method, comprising:
redirecting a request to open a first document to a background process that controls access to one or more documents including the first document and a second document;
determining policy information associated with the first document and a user of a first managed application on whose behalf the request to open the first document was received;
determining, dependent on the policy information associated with the first document and the user, that the first document is a protected document in the first managed application;
determining that the user is authorized to open the first document;
providing the first document to the first managed application;
redirecting a request to open the second document in the first managed application or in a second managed application to the background process on behalf of the user;
determining policy information associated with the second document and the user;
determining, dependent on the policy information associated with the second document and the user, that the second document is an unprotected document;
determining that the user is authorized to open the second document;
providing the second document to the first managed application or the second managed application;
detecting a request to copy protected data from the first document to a system clipboard accessible by unprotected documents;
redirecting the protected data to a secure clipboard, the secure clipboard being separate from the system clipboard and inaccessible by unprotected documents;
detecting a request to paste the protected data into the second document; and
refraining from pasting the protected data into the second document.

7. The method of claim 6, further comprising:
determining that a third document is a protected document;
detecting a request to paste the protected data into the third document; and
pasting the protected data from the secure clipboard into the third document.

8. The method of claim 7, wherein the third document is a protected document in the second managed application, the second managed application being different from the first managed application.

9. The method of claim 6, further comprising:
detecting a request to copy unprotected data from the second document to the system clipboard;
copying the unprotected data to the system clipboard;
detecting a request to paste the unprotected data into the first document; and
pasting the unprotected data from the system clipboard into the first document.

10. The method of claim 6, wherein detecting the request to copy the protected data from the first document to the system clipboard comprises:
detecting a request to copy one or more data objects from the first document to the system clipboard; and
determining, dependent on a data protection policy, that the one or more data objects are classified as protected data, the data protection policy being applicable to documents in the first managed application, documents in applications sourced from a given vendor, the user of the first managed application, a security level associated with the first document, a security level associated with the first managed application, or a data type of the one or more data objects.

11. The method of claim 6, further comprising providing, to the user of the first managed application, a notification that the request to paste the protected data into the second document was not fulfilled.

12. The method of claim 11, wherein providing the notification comprises pasting data representing the notification into the second document in place of the protected data.

13. A non-transitory, computer-readable memory medium including instructions that, when executed by at least one processor of an information handling system, cause the information handling system to:
redirect a request to open a first document to a background process that controls access to one or more documents including the first document and a second document;
determine policy information associated with the first document and a user of a first managed application on whose behalf the request to open the first document was received;
determine, dependent on the policy information associated with the first document and the user, that the first document is a protected document in the first managed application;
determine that the user is authorized to open the first document;
provide the first document to the first managed application;
redirect a request to open the second document in the first managed application or in a second managed application to the background process on behalf of the user;
determine policy information associated with the second document and the user;

determine, dependent on the policy information associated with the second document and the user, that the second document is an unprotected document;

determine that the user is authorized to open the second document;

provide the second document to the first managed application or the second managed application;

detect a request to copy protected data from the first document to a system clipboard accessible by unprotected documents;

redirect the protected data to a secure clipboard, the secure clipboard being separate from the system clipboard and inaccessible by unprotected documents;

detect a request to paste the protected data into the second document; and refrain from pasting the protected data into the second document.

14. The non-transitory, computer-readable memory medium of claim 13, wherein the instructions further cause the information handling system to:

determine that a third document is a protected document;

detect a request to paste the protected data into the third document; and paste the protected data from the secure clipboard into the third document.

15. The non-transitory, computer-readable memory medium of claim 13, wherein the instructions further cause the information handling system to:

detect a request to copy unprotected data from the second document to the system clipboard;

copy the unprotected data to the system clipboard;

detect a request to paste the unprotected data into the first document; and paste the unprotected data from the system clipboard into the first document.

16. The non-transitory, computer-readable memory medium of claim 13, wherein the instructions further cause the information handling system to provide, to the user of the first managed application, a notification that the request to paste the protected data into the second document was not fulfilled.

17. The non-transitory, computer-readable memory medium of claim 13, wherein the instructions further cause the information handling system to:

launch a data protection client process in response to initiation of a user session on behalf of the user of the first managed application; and implement, by the data protection client process during the user session, the secure clipboard.

* * * * *